US012589629B2

(12) United States Patent
Kim et al.

(10) Patent No.: US 12,589,629 B2
(45) Date of Patent: Mar. 31, 2026

(54) VEHICULAR AIR CONDITIONING SYSTEM

(71) Applicant: Hanon Systems, Daejeon (KR)

(72) Inventors: In Hyeok Kim, Daejeon (KR); Young Man Kim, Daejeon (KR); Jae Kyun Kim, Daejeon (KR); Kyeong Cheol Lee, Daejeon (KR); Jae Min Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 190 days.

(21) Appl. No.: 18/267,122

(22) PCT Filed: Jul. 28, 2022

(86) PCT No.: PCT/KR2022/011111
§ 371 (c)(1),
(2) Date: Jun. 14, 2023

(87) PCT Pub. No.: WO2023/018074
PCT Pub. Date: Feb. 16, 2023

(65) Prior Publication Data
US 2024/0116330 A1 Apr. 11, 2024

(30) Foreign Application Priority Data
Aug. 13, 2021 (KR) ........................ 10-2021-0107265

(51) Int. Cl.
*B60H 1/00* (2006.01)
(52) U.S. Cl.
CPC ..... *B60H 1/00864* (2013.01); *B60H 1/00671* (2013.01); *B60H 1/00835* (2013.01)
(58) Field of Classification Search
USPC .................................................. 454/69–165
See application file for complete search history.

(56) References Cited

U.S. PATENT DOCUMENTS

| | | | |
|---|---|---|---|
| 6,322,440 B1 | 11/2001 | Nakatani | |
| 2016/0082804 A1* | 3/2016 | Kim ................... | B60H 1/00028 |
| | | | 165/203 |
| 2017/0190234 A1* | 7/2017 | Maeng ............... | B60H 1/00849 |

FOREIGN PATENT DOCUMENTS

| | | | | |
|---|---|---|---|---|
| JP | 2004161060 A | 6/2004 | | |
| KR | 19990036545 U | 9/1999 | | |
| KR | 20150022501 A | * 3/2015 | ......... | B60H 1/00849 |
| KR | 20150116514 A | 10/2015 | | |

OTHER PUBLICATIONS

International Search Report issued in PCT/KR2022/011111 on Nov. 1, 2022.

* cited by examiner

*Primary Examiner* — Ko-Wei Lin
(74) *Attorney, Agent, or Firm* — NORTON ROSE FULBRIGHT US LLP

(57) ABSTRACT

A vehicular air conditioning system includes: an intake part including an intake door configured to open an outdoor air inlet to introduce an outdoor air in an outdoor air mode, open an indoor air inlet to introduce an indoor air in an indoor air mode, and control an opening degree of the outdoor air inlet or the indoor air inlet, and a blower configured to suck the indoor air or the outdoor air through the indoor air inlet or the outdoor air inlet and blow the indoor air or the outdoor air into a vehicle interior; and a control part configured to control a rotational speed of the blower according to an air flow rate level of the air conditioning system.

10 Claims, 4 Drawing Sheets

Engine room

Vehicle interior

Control part

Indoor/outdoor air mode detection part

VEHICULAR AIR CONDITIONING SYSTEM

CROSS REFERENCE TO RELATED APPLICATIONS

This patent application is a national phase under 35 U.S.C. § 371 of International Patent Application No. PCT/KR2022/011111 filed Jul. 28, 2022, which claims the benefit of priority from Korean Patent Application No. 10-2021-0107265 filed Aug. 13, 2021, each of which is hereby incorporated herein by reference in its entirety for all purposes.

TECHNICAL FIELD

The present invention relates to a vehicular air conditioning system, and more particularly, a vehicular air conditioning system capable of, in an outdoor air mode, compensating for the decrease in an air introduction amount due to the intake ventilation resistance of a moisture inflow blocking wall on the cowl side, and consequently preventing the change in the temperature of an air discharged into the vehicle interior due to the decrease in an air introduction amount and the resultant deterioration of the cooling and heating performance in the vehicle interior.

BACKGROUND ART

For the convenience of vehicle occupants, it is necessary to secure a wide vehicle interior space. In order to meet this need, securing a vehicle interior space has become an important task.

As a method for securing a vehicle interior space, as shown in FIG. 1, there is a technique of arranging a part of an air conditioning system 1 for cooling and heating the vehicle interior on the engine room side.

In this technique, an intake part 3 of the air conditioning system 1 is disposed on the engine room side with respect to a dash panel D, thereby minimizing the part of the air conditioning system 1 disposed inside the vehicle interior.

Therefore, this technique is very advantageous to secure the vehicle interior space, which makes it possible to improve the convenience of occupants by increasing the utilization of the vehicle interior space.

However, in such a conventional air conditioning system, the outdoor air inlet 5 for introducing the outdoor air has to face upward due to the structure of the intake part 3 disposed on the engine room side. Due to this structure, various foreign substances such as moisture and dust are easily introduced toward the outdoor air inlet 5.

In particular, the outdoor air inlet 5 communicates with the vehicle exterior through an air inlet 7a on the side of a cowl 7. Because of this structure, moisture such as rainwater or the like accumulated on the upper surface of the cowl 7 may be introduced into the outdoor air inlet 5.

Moreover, as shown in FIG. 2, the intake part 3 has to be installed in the central portion on the engine room side due to the structure thereof. Because of this structure, the outdoor air inlet 5 of the intake part 3 corresponds to cowl top 7b. As a result, a large amount of moisture accumulated on the cowl top 7b may be introduced into the outdoor air inlet 5.

In consideration of this, there is proposed a technique in which as shown in FIG. 2, moisture inflow blocking walls 8 are installed on the cowl top 7b around the air inlet 7a to restrict the movement of moisture toward the air inlet 7a. This technique prevents moisture from entering the intake part 3 through the air inlet 7a by restricting the movement of moisture toward the air inlet 7a. Therefore, contamination and failure of the intake part 3 due to inflow of moisture are prevented.

However, such a conventional air conditioning system has a disadvantage that the moisture inflow blocking walls 8 around the air inlet 7a serves as an intake ventilation resisting part which hinders the inflow of the outdoor air, and the intake ventilation resistance is generated due to the moisture inflow blocking walls 8 around the air inlet 7a. Thus, the amount of air introduced into the outdoor air inlet of the intake part 3 is significantly reduced.

In particular, when an intake door 9 is completely switched to an outdoor air mode position A, the air is introduced only through the outdoor air inlet 5. In this case, the air introduction amount is significantly reduced as compared with an indoor/outdoor air mixing mode position B and an indoor air mode position C where the air introduction rate through the outdoor air inlet 5 is relatively low.

Therefore, under the condition of the same air flow rate level of a blower 1a, in the outdoor air mode, the amount of air blown into the vehicle interior is significantly reduced as compared with other modes. As a result, the temperature of the air discharged into the vehicle interior is not controlled as the set value.

In particular, since the amount of the air blown into the vehicle interior is significantly reduced compared with the indoor/outdoor air mixing mode and the indoor air mode, the temperature of the air discharged into the vehicle interior is changed according to the air intake mode.

Therefore, a variation occurs in the cooling and heating performance for the vehicle interior depending on the air intake mode. As a result, the comfort in the vehicle interior is remarkably degraded.

SUMMARY

In view of the problems inherent in the related art, it is an object of the present invention to provide a vehicular air conditioning system capable of, in an outdoor air mode, compensating for the decrease in an air introduction amount due to the intake ventilation resistance of a moisture inflow blocking wall.

Another object of the present invention is to provide a vehicular air conditioning system capable of, in an outdoor air mode, preventing the change in the temperature of an air discharged into the vehicle interior due to the decrease in an air introduction amount.

A further object of the present invention is to provide a vehicular air conditioning system capable of preventing the change in the temperature of an air discharged into the vehicle interior, which is generated between an outdoor air mode and other air intake modes, and the resultant deterioration of the cooling and heating performance in the vehicle interior.

In order to achieve these objects, there is provided a vehicular air conditioning system, including: an intake part including an intake door configured to open an outdoor air inlet to introduce an outdoor air in an outdoor air mode, open an indoor air inlet to introduce an indoor air in an indoor air mode, and control an opening degree of the outdoor air inlet or the indoor air inlet, and a blower configured to suck the indoor air or the outdoor air through the indoor air inlet or the outdoor air inlet and blow the indoor air or the outdoor air into a vehicle interior; and a control part configured to control a rotational speed of the blower according to an air flow rate level of the air conditioning system, wherein the control part is configured to control the blower to rotate at different rotational speeds according to air intake modes at the same air flow rate level.

In the system, the control part may be configured to execute control to make the rotational speed of the blower higher in the outdoor air mode by a preset value than in the indoor air mode at the same flow rate level.

In the system, the intake part may be installed on the engine room side with respect to a dash panel, the outdoor air inlet may communicate with the outside of the vehicle interior through a cowl-side air inlet to introduce the outdoor air, the indoor air inlet may communicate with the vehicle interior to introduce the indoor air, and an intake ventilation resisting part for hindering inflow of the outdoor air introduced through the air inlet may be formed on the cowl side.

In the system, the intake ventilation resisting part may be a moisture inflow blocking wall installed on a cowl-side portion around the outdoor air inlet to block the flow of moisture into the outdoor air inlet, and the control part may be configured to further increase the rotational speed of the blower in the outdoor air mode to compensate for a decrease in an air introduction amount through the outdoor air inlet due to an intake ventilation resistance of the moisture inflow blocking wall.

In the system, the control part may be configured to make the rotational speed of the blower higher in the outdoor air mode than in the indoor air mode, and the control part may be configured to increase the rotational speed of the blower only when the blower is operating at a preset rotation speed level, and maintain the same rotational speed when the blower is operating at rotation speed levels other than the preset rotation speed level.

In the system, the control part may be configured to execute control to make the rotational speed of the blower higher in the outdoor air mode than in the indoor air mode, and may be configured to further increase the rotational speed of the blower only when the blower is operating at a preset low rotation speed level.

In the system, the air intake modes may include an outdoor air mode for sucking only the indoor air, an outdoor air mode for sucking only the outdoor air, and an indoor/outdoor air mixing mode for sucking the indoor air and the outdoor air by opening the indoor air inlet and the outdoor air inlet, and the control part may be configured to execute control to make the rotational speed of the blower higher in the outdoor air mode by a preset value than in the indoor air mode and the indoor/outdoor air mixing mode.

In the system, the control part may be configured to store PWM duty ratio table values for respective blower rotation speed levels in the outdoor air mode and PWM duty ratio table values for respective blower rotation speed levels in other air intake modes than the outdoor air mode, and the control part may be configured to control the blower to rotate at different rotational speeds in the outdoor air mode or other air intake modes based on the PWM duty ratio table values for respective blower rotation speed levels.

Further, there is provided a vehicular air conditioning system, including: an intake part including an intake door configured to open an outdoor air inlet to introduce an outdoor air in an outdoor air mode, open an indoor air inlet to introduce an indoor air in an indoor air mode, and control an opening degree of the outdoor air inlet or the indoor air inlet, and a blower configured to suck the indoor air or the outdoor air through the indoor air inlet or the outdoor air inlet and blow the indoor air or the outdoor air into a vehicle interior; and a control part configured to control a rotational speed of the blower according to an air flow rate level of the air conditioning system, wherein the control part is configured to control the blower to rotate at different rotational speeds according to a position of the intake door at the same air flow rate level.

In the system, the control part may be configured to execute control to increase the rotational speed of the blower in preparation for a case where the intake door at least partially opens the indoor air inlet when the intake door is positioned so as to open only the outdoor air inlet, and the control part may be configured to execute control so that a PWM duty ratio of the blower when opening only the outdoor air inlet is higher by 50% or more than a PWM duty ratio of the blower when at least partially opening the indoor air inlet.

According to the vehicular air conditioning system of the present invention, the rotational speed of the blower is further increased in the outdoor air mode. Therefore, the decrease in the amount of the air introduced through the intake part due to the intake ventilation resistance of the moisture inflow blocking wall on the cowl side can be compensated for in the outdoor air mode.

In addition, since the decrease in the amount of the air introduced through the intake part due to the intake ventilation resistance of the moisture inflow blocking wall on the cowl side can be compensated for in the outdoor air mode, it is possible to, in the outdoor air mode, prevent the change in the temperature of the air discharged into the vehicle interior due to the decrease in the amount of the air introduced through the intake part.

In addition, since the change in the temperature of the air discharged into the vehicle interior due to the decrease in the air introduction amount can be prevented in the outdoor air mode, it is possible to, under the condition of the same air flow rate level of the blower, prevent the variation in the temperature of the air discharged into the vehicle interior, which is generated between the outdoor air mode and other air intake modes, and the resultant deterioration of the cooling and heating performance in the vehicle interior.

DETAILED DESCRIPTION

Preferred embodiments of a vehicular air conditioning system according to the present invention will now be described in detail with reference to the accompanying drawings.

Figure 3:
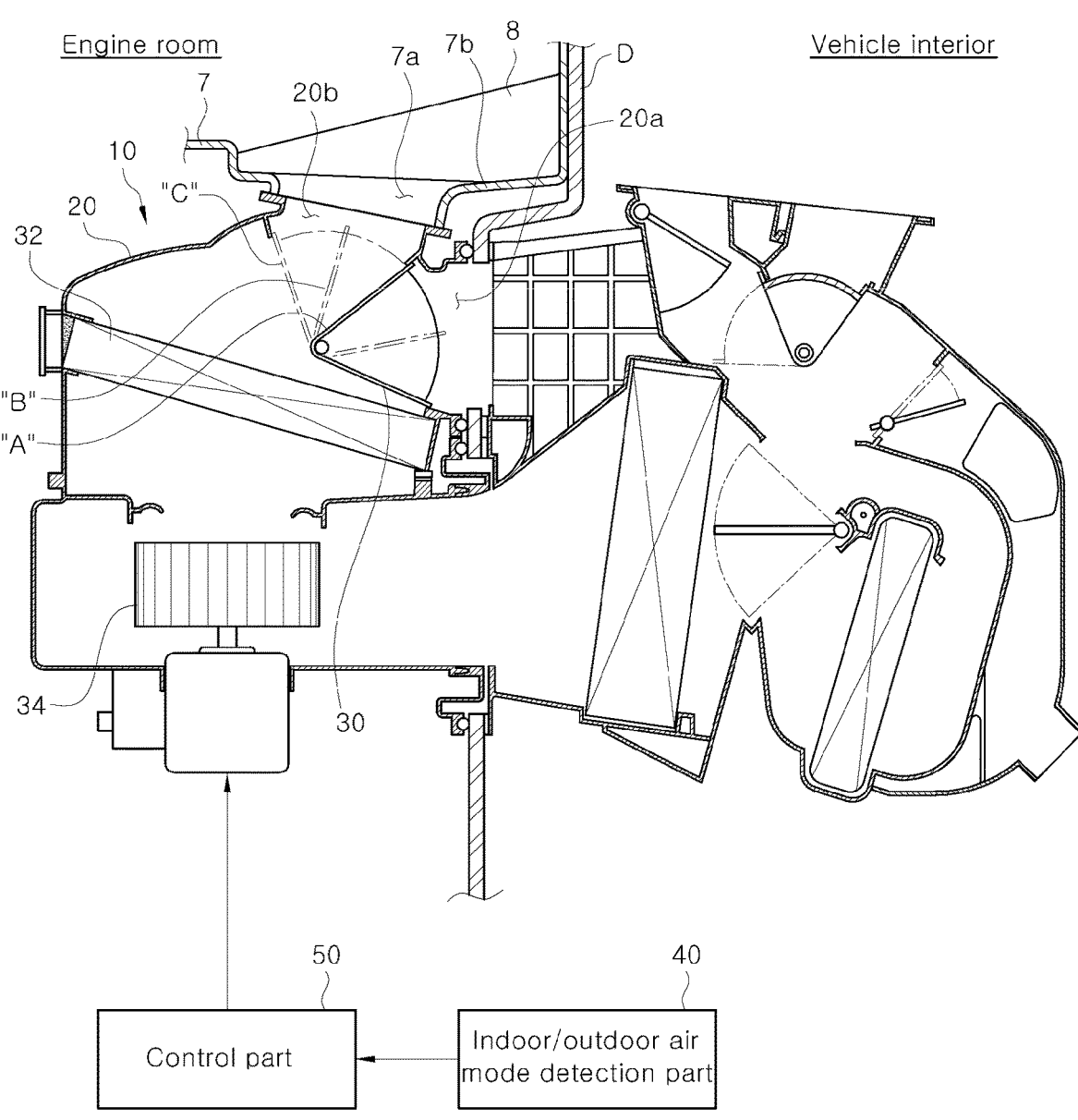
FIG. 3 is a view showing a vehicular air conditioning system according to the present invention.

Prior to describing the features of the vehicular air conditioning system according to the present invention, the vehicular air conditioning system will be briefly described with reference to FIG. 3.

A vehicular air conditioning system includes an intake part 10 that sucks and blows an indoor air and/or an outdoor air into a vehicle interior.

The intake part 10 is installed on the engine room side with respect to a dash panel D, and includes an intake case 20.

The intake case 20 has an indoor air inlet 20a and an outdoor air inlet 20b. An intake door 30 is installed between the indoor air inlet 20a and the outdoor air inlet 20b.

The indoor air inlet 20a communicates with the vehicle interior to introduce air existing in the vehicle interior (hereinafter abbreviated as "indoor air").

The outdoor air inlet 20b communicates with the vehicle exterior through an air inlet 7a of a cowl 7 to introduce air existing outside the vehicle (hereinafter abbreviated as "outdoor air").

The intake door 30 is a dome type door that rotates between the outdoor air inlet 20b and the indoor air inlet 20a, and is controlled to assume an outdoor air mode position A or an indoor air mode position C to selectively opening the outdoor air inlet 20b or the indoor air inlet 20a.

Therefore, the outdoor air or the indoor air can be introduced selectively in conformity with the indoor air mode for sucking only the indoor air or the outdoor air mode for sucking only the outdoor air.

In addition, the intake door 30 may be controlled to assume an indoor/outdoor air mixing mode B to simultaneously open the outdoor air inlet 20b and the indoor air inlet 20a, so that the indoor air and the outdoor air can be introduced simultaneously in conformity with the indoor/outdoor air mixing mode.

In addition, the intake part 10 includes an air filter 32 and a blower 34.

The air filter 32 is configured to filter foreign substances in the indoor air and/or the outdoor air introduced through the outdoor air inlet 20b and the indoor air inlet 20a. The blower 34 is configured to suck the indoor air and the outdoor air through the indoor air inlet 20a and the outdoor air inlet 20b and, and blow the sucked indoor air and outdoor air into the vehicle interior.

The rotation speed level of the blower 34 is automatically adjusted according to the temperature conditions inside and outside the vehicle and the user-set temperature. In some cases, when the user manually selects the rotation speed level, the rotation speed level of the blower 34 is adjusted according to the rotation speed level selected by the user.

Next, features of the vehicular air conditioning system according to the present invention will be described in detail with reference to FIG. 3.

The vehicular air conditioning system of the present invention further includes an indoor/outdoor air mode detection part 40 that detects whether the current air intake mode is an indoor air mode, an outdoor air mode, or an indoor/outdoor air mixing mode.

The indoor/outdoor air mode detection part 40 includes an automatic control unit (not shown) that automatically controls the vehicular air conditioning system.

The automatic control unit automatically controls the air intake modes, for example, the indoor air mode, the outdoor air mode, and the indoor/outdoor air mixing mode according to the temperature inside and outside the vehicle and the state of contamination of the air. When the air intake modes are automatically controlled, a signal of the automatically controlled mode is outputted so that the indoor air mode, the outdoor air mode, or the indoor/outdoor air mixing mode can be detected.

In this regard, the indoor/outdoor air mode detection part 40 may include a door sensor (not shown) for detecting the current air intake mode by detecting the position of the intake door 30.

The vehicular air conditioning system of the present invention includes a control part 50.

The control part 50 is provided with a microprocessor. When the current air intake mode is inputted from the indoor/outdoor air mode detection part 40, the control part 50 controls the blower 34 to rotate at different rotational speeds according to the inputted air intake mode.

For example, the control part 50 is configured to make the rotational speed of the blower 34 higher in the outdoor air mode than in the indoor air mode or the indoor/outdoor air mixing mode.

The reason for adopting this configuration is to assure that the decrease in the amount of the air introduced through the intake part 10 due to the intake ventilation resistance of the moisture inflow blocking wall 8 on the cowl 7 side is compensated for in the outdoor air mode by further increasing the rotational speed of the blower 34 in the outdoor air mode.

Therefore, in the outdoor air mode, it is possible to prevent the change in the temperature of the air discharged into the vehicle interior due to the decrease in the amount of the air introduced through the intake part 10 and the resultant deterioration of the cooling and heating performance in the vehicle interior.

As a result, the control part 50 controls the blower 34 to rotate at different rotational speeds according to the air intake mode at the same air flow rate level, which makes it possible to compensate for the variation in the air introduction amount in the intake part 10, which is generated between the air intake modes.

On the other hand, in the outdoor air mode, the control part 50 executes control to make the rotational speed of the blower 34 higher in the outdoor air mode than in other air intake modes, i.e., the indoor air mode or the indoor/outdoor air mixing mode, and preferably executes control to increase the rotational speed of the blower 34 by a preset rotation speed level.

For example, in the outdoor air mode, the control part 50 preferably executes control to make the rotational speed of the blower 34 higher by 0.5 rotation speed level than in the indoor air mode or the indoor/outdoor air mixing mode.

More preferably, the control part 50 is configured to differently set PWM duty ratio table values for respective blower rotation speed levels in the outdoor air mode and PWM duty ratio table values for respective blower rotation speed levels in other air intake modes as shown in Table 1 and Table 2 below.

The control part 50 is configured to control the blower 34 to rotate at different rotational speeds in the outdoor air mode and other air intake modes based on the duty ratio table values for respective blower rotation speed levels.

In particular, the control part 50 is configured to execute control to make the rotational speed of the blower 34 higher in the outdoor air mode than in other air intake modes, i.e., the indoor air mode and the indoor/outdoor air mixing mode.

TABLE 1

| PWM duty ratio table values for respective blower rotation speed levels in the indoor air mode and the indoor/outdoor air mixing mode | |
|---|---|
| Blower rotation speed level | Blower PWM duty ratio (%) |
| Off | 5.0 |
| First level | 10.0 |
| Second level | 10.0 |
| Third level | 30.0 |
| Fourth level | 50.0 |

TABLE 1-continued

PWM duty ratio table values for respective blower rotation speed levels
in the indoor air mode and the indoor/outdoor air mixing mode

| Blower rotation speed level | Blower PWM duty ratio (%) |
|---|---|
| Fifth level | 70.0 |
| Sixth level | 89.0 |
| Seventh level | 92.0 |

TABLE 2

PWM duty ratio table values for respective blower
rotation speed levels in the outdoor air mode

| Blower rotation speed level | Blower PWM duty ratio (%) |
|---|---|
| Off | 5.0 |
| First level | 16.0 |
| Second level | 16.0 |
| Third level | 30.0 |
| Fourth level | 50.0 |
| Fifth level | 70.0 |
| Sixth level | 89.0 |
| Seventh level | 92.0 |

Meanwhile, the control part 50 is configured to make the rotational speed of the blower 34 higher in the outdoor air mode than in the indoor air mode or the indoor/outdoor air mixing mode. The control part 50 is configured to increase the rotational speed only when the blower 34 is operating at a preset rotation speed level, and maintain the same rotational speed when the blower 34 is operating at the rotation speed levels other than the preset rotation speed level.

Preferably, the control part 50 is configured to make the rotational speed of the blower 34 higher in the outdoor air mode than in the indoor air mode or the indoor/outdoor air mixing mode only when the blower 34 is operating at a preset low rotation speed level.

For example, the control part 50 is configured to make the rotational speed of the blower 34 higher only when the rotation speed level of the blower 34 is a first level or a second level in the outdoor air mode.

Figure 1:
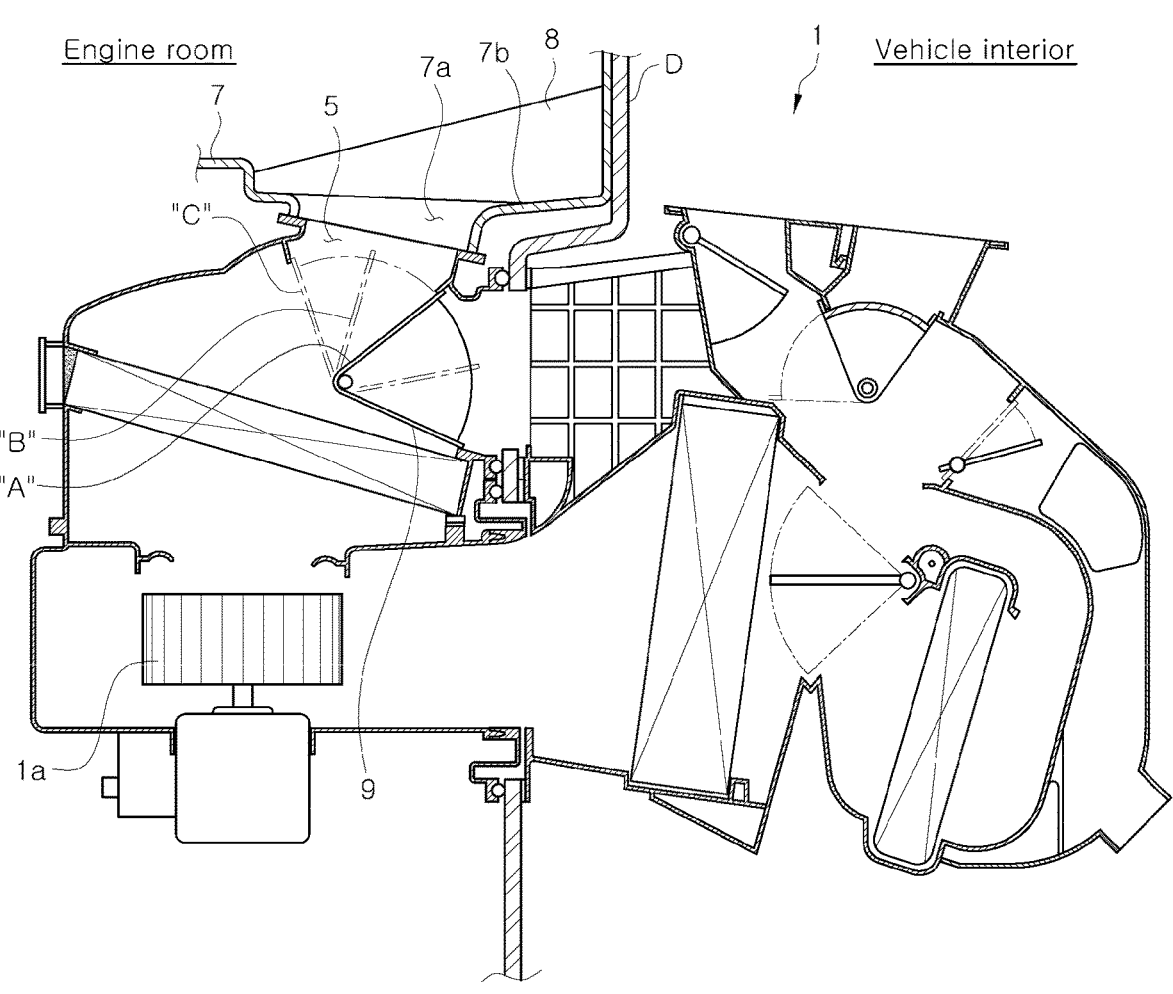
FIG. 1 is a cross-sectional view showing a conventional vehicular air conditioning system.
Figure 2:
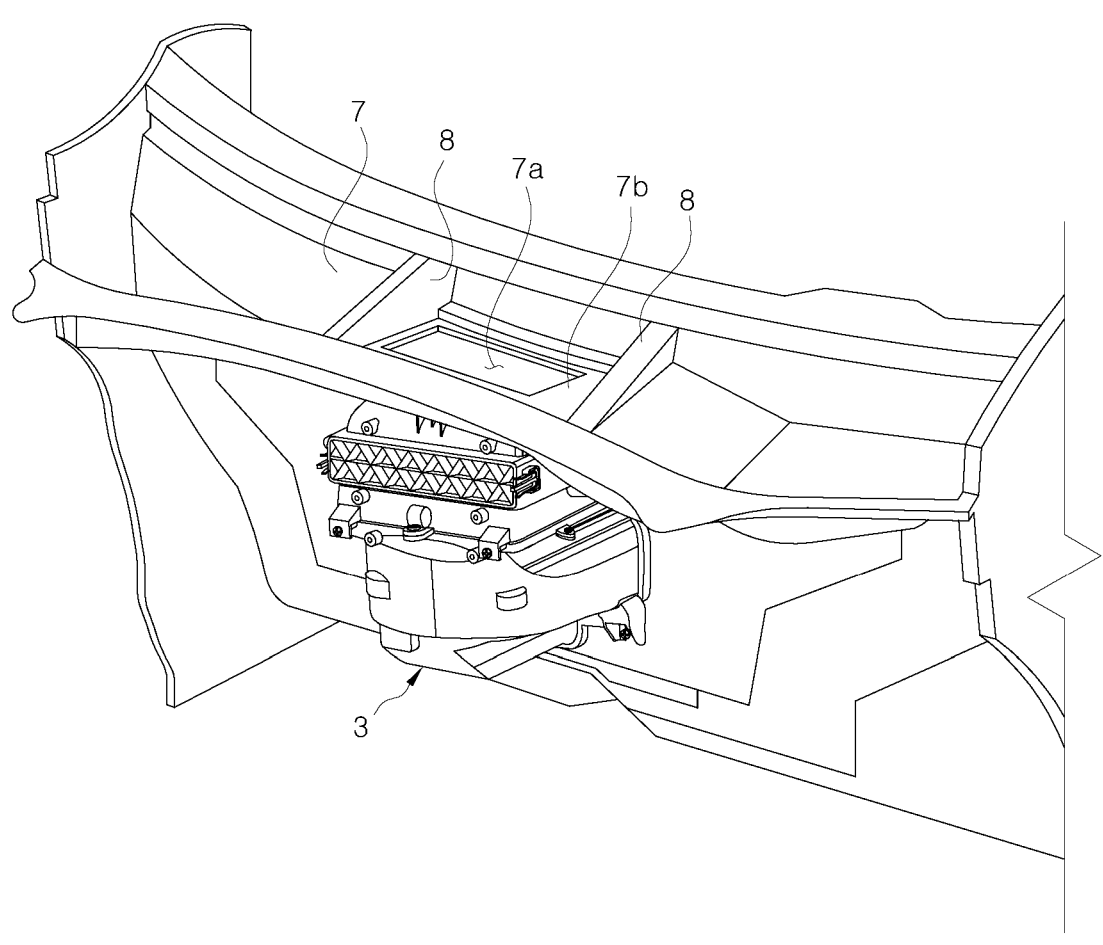
FIG. 2 is a perspective view showing a state in which the conventional vehicular air conditioning system is installed on a vehicle body.

The reason for adopting this configuration is that when the blower 34 rotates at a low rotation speed level below a predetermined rotation speed level, the reduction rate of the air introduction amount due to the intake ventilation resistance of the moisture inflow blocking wall 8 (see FIG. 2) is very large as compared with the case where the blower 34 rotates at a medium or high rotation speed level above predetermined rotation speed level.

Therefore, it is possible to effectively compensate for the intake ventilation resistance of the moisture inflow blocking wall 8 generated when the blower 34 is operating at a low rotation speed level, and the resultant decrease in the air introduction amount.

As described above, the increase in the rotational speed of the blower 34 in the outdoor air mode only under the low rotation speed level of the blower 34 is reflected in the PWM duty ratio table values for respective blower rotation speed levels in the outdoor air mode as shown in Table 2. Based on this, the control part 50 controls the increase in the rotational speed of the blower 34 in the outdoor air mode only when the blower 34 is operating at a first level or a second level.

Meanwhile, the control part 50 may differentially control the rotational speed of the blower 34 according to the air intake mode, and may differentially control the rotational speed of the blower 34 according to the opening position of the intake door 30 with respect to the indoor air inlet 20a and the outdoor air inlet 20b.

That is, the control part 50 is configured to execute control to increase the rotational speed of the blower 34 in preparation for a case where the intake door 30 at least partially opens the indoor air inlet 20a when the intake door 30 is positioned so as to open only the outdoor air inlet 20b. The control part 50 may be configured to execute control so that the PWM duty ratio of the blower 34 when opening only the outdoor air inlet 20b is higher by, for example, 50% or more, than the PWM duty ratio of the blower 34 when at least partially opening the indoor air inlet 20a.

Next, an operation example of the vehicular air conditioning system according to the present invention having such a configuration will be described with reference to FIGS. 3 and 4.

Figure 4:
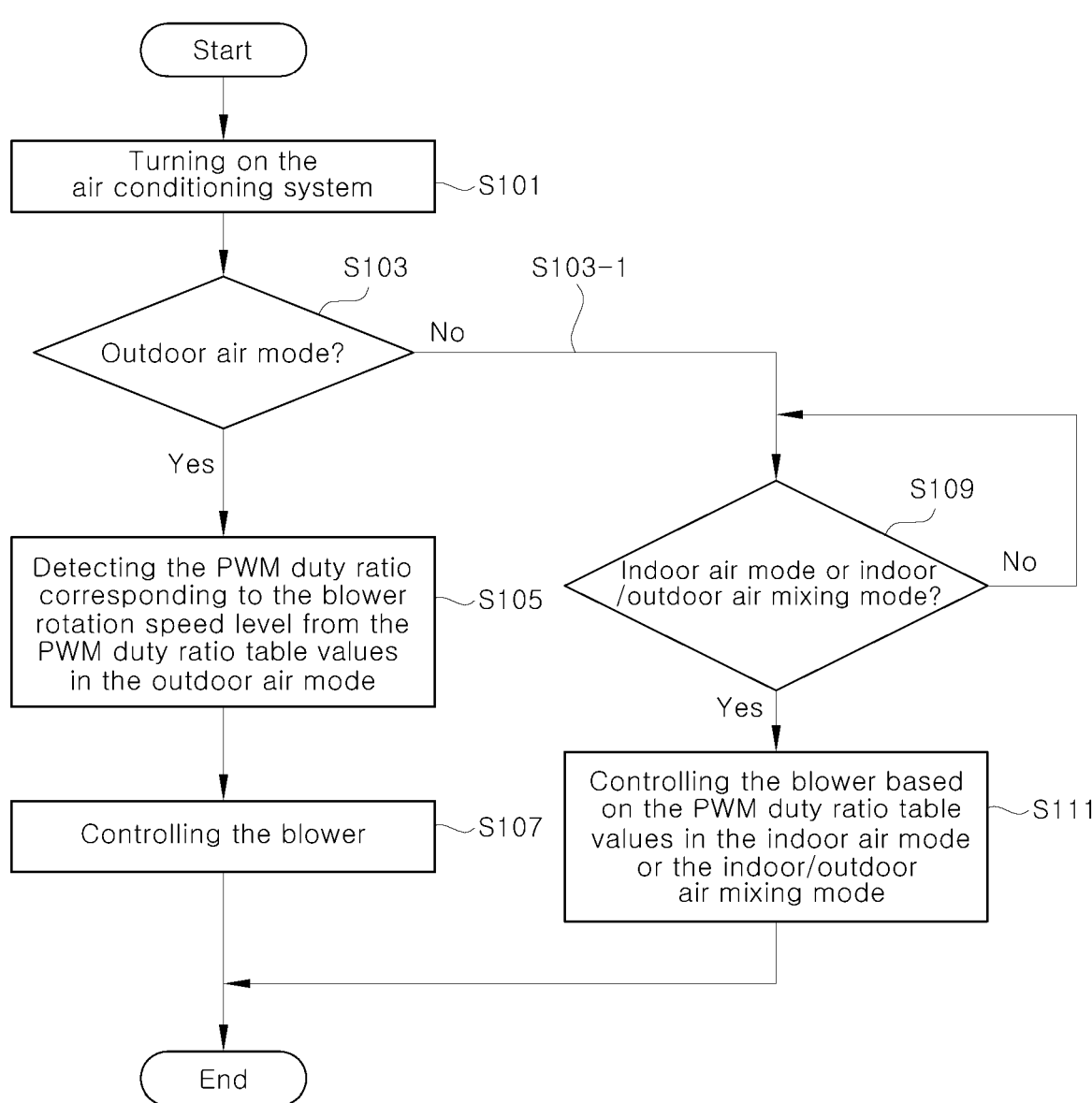
FIG. 4 is a flowchart showing an operation example of the vehicular air conditioning system according to the present invention.

Referring first to FIG. 4, when the air conditioning system is turned on (S101), it is determined whether the air intake mode is the outdoor air mode (S103).

As a result of the determination, if the air intake mode is the outdoor air mode, the control part 50 detects the PWM duty ratio of the blower 34 corresponding to the current rotation speed level of the blower 34 from pre-stored PWM duty ratio table values for respective blower rotation speed levels in the outdoor air mode shown in Table 2 (S105).

When the detection of the PWM duty ratio of the blower 34 is completed, the blower 34 is controlled with the detected PWM duty ratio (S107).

Then, the rotation speed level of the blower 34 is increased according to the preset control value. The increased rotation speed level of the blower 34 compensates for the decrease in the air introduction amount of the intake part 10 due to the intake ventilation resistance of the moisture inflow blocking wall 8 on the cowl 7 side.

As a result, in the outdoor air mode, it is possible to prevent the change in the temperature of the air discharged into the vehicle interior due to the decrease in the air introduction amount through the intake part 10, and the resultant deterioration of the cooling and heating performance in the vehicle interior.

On the other hand, as a result of the determination in step S103, if the air intake mode is not the outdoor air mode (S103-1), it is determined whether the air intake mode is the indoor air mode or the indoor/outdoor air mixing mode (S109).

As a result of the determination, if the air intake mode is the indoor air mode or the indoor/outdoor air mixing mode, the control part 50 controls the blower 34 based on pre-stored PWM duty ratio table values for respective blower rotation speed levels in the indoor air mode and the indoor/outdoor air mixing mode shown in Table 1 (S111).

According to the vehicular air conditioning system of the present invention having such a configuration, the rotational speed of the blower 34 is further increased in the outdoor air mode. Therefore, the decrease in the amount of the air introduced through the intake part 10 due to the intake ventilation resistance of the moisture inflow blocking wall 18 on the cowl 7 side can be compensated for in the outdoor air mode.

In addition, since the decrease in the amount of the air introduced through the intake part 10 due to the intake ventilation resistance of the moisture inflow blocking wall 18 on the cowl 7 side can be compensated for in the outdoor air mode, it is possible to, in the outdoor air mode, prevent the change in the temperature of the air discharged into the vehicle interior due to the decrease in the amount of the air introduced through the intake part 10.

In addition, since the change in the temperature of the air discharged into the vehicle interior due to the decrease in the air introduction amount can be prevented in the outdoor air mode, it is possible to, under the condition of the same air flow rate level of the blower 34, prevent the variation in the temperature of the air discharged into the vehicle interior, which is generated between the outdoor air mode and other air intake modes, and the resultant deterioration of the cooling and heating performance in the vehicle interior.

While the preferred embodiments of the present invention have been described above, the present invention is not limited to the above-described embodiments. Various modifications and changes may be made without departing from the scope and spirit of the present invention defined in the claims.

What is claimed is:

1. A vehicular air conditioning system, comprising:

an intake part including an intake door configured to open an outdoor air inlet to introduce an outdoor air in an outdoor air mode, open an indoor air inlet to introduce an indoor air in an indoor air mode, and control an opening degree of the outdoor air inlet or the indoor air inlet, and a blower configured to suck the indoor air or the outdoor air through the indoor air inlet or the outdoor air inlet and blow the indoor air or the outdoor air into a vehicle interior; and a control part configured to control a rotational speed of the blower according to an air flow rate level of the air conditioning system, wherein the rotational speed level of the blower is automatically adjusted according to the temperature conditions inside and outside the vehicle and the user-set temperature or the rotational speed level of the blower is adjusted according to the rotational speed level selected by the user when a user manually selects the rotational speed level from off to seventh level, and wherein the control part is configured to control the blower to rotate at different rotational speeds according to the outdoor air mode or indoor air mode at the same air flow rate level of the air conditioning system, and wherein the control part is configured to execute control to make the rotational speed of the blower higher in the outdoor air mode by a preset value than in the indoor air mode at the same flow rate level.

2. The system of claim 1, wherein the intake part is installed on the engine room side with respect to a dash panel, the outdoor air inlet communicates with the outside of the vehicle interior through a cowl-side air inlet to introduce the outdoor air, the indoor air inlet communicates with the vehicle interior to introduce the indoor air, and an intake ventilation resisting part for hindering inflow of the outdoor air introduced through the air inlet is formed on the cowl side.

3. The system of claim 2, wherein the intake ventilation resisting part is a moisture inflow blocking wall installed on a cowl-side portion around the outdoor air inlet to block the flow of moisture into the outdoor air inlet, and the control part is configured to further increase the rotational speed of the blower in the outdoor air mode to compensate for a decrease in an air introduction amount through the outdoor air inlet due to an intake ventilation resistance of the moisture inflow blocking wall.

4. The system of claim 1, wherein the control part is configured to make the rotational speed of the blower higher in the outdoor air mode than in the indoor air mode, and the control part is configured to increase the rotational speed of the blower only when the blower is operating at a preset rotation speed level, and maintain the same rotational speed when the blower is operating at rotation speed levels other than the preset rotation speed level.

5. The system of claim 4, wherein the control part is configured to execute control to make the rotational speed of the blower higher in the outdoor air mode than in the indoor air mode, and is configured to further increase the rotational speed of the blower only when the blower is operating at a preset low rotation speed level.

6. The system of claim 5, wherein the low rotation speed level is a first level or a second level.

7. The system of claim 2, wherein the indoor air mode is configured to intake indoor air, the outdoor air mode is configured to intake outdoor air, and an indoor/outdoor air mixing mode is configured to intake the indoor air and the outdoor air by opening the indoor air inlet and the outdoor air inlet, and the control part is configured to execute control to make the rotational speed of the blower higher in the outdoor air mode by a preset value than in the indoor air mode and the indoor/outdoor air mixing mode.

8. A vehicular air conditioning system, comprising:

an intake part including an intake door configured to open an outdoor air inlet to introduce an outdoor air in an outdoor air mode, open an indoor air inlet to introduce an indoor air in an indoor air mode, and control an opening degree of the outdoor air inlet or the indoor air inlet, and a blower configured to suck the indoor air or the outdoor air through the indoor air inlet or the outdoor air inlet and blow the indoor air or the outdoor air into a vehicle interior; and a control part configured to control a rotational speed of the blower according to an air flow rate level of the air conditioning system, wherein the control part is configured to control the blower to rotate at different rotational speeds according to the outdoor air mode or indoor air mode at the same air flow rate level of the air conditioning system, and wherein the control part is configured to store PWM duty ratio table values for respective blower rotation speed levels in the outdoor air mode and PWM duty ratio table values for respective blower rotation speed levels in other air intake modes than the outdoor air mode, and the control part is configured to control the blower to rotate at different rotational speeds in the outdoor air mode or other air intake modes based on the PWM duty ratio table values for respective blower rotation speed levels.

9. A vehicular air conditioning system, comprising:

an intake part including an intake door configured to open an outdoor air inlet to introduce an outdoor air in an outdoor air mode, open an indoor air inlet to introduce an indoor air in an indoor air mode, and control an opening degree of the outdoor air inlet or the indoor air inlet, and a blower configured to suck the indoor air or the outdoor air through the indoor air inlet or the outdoor air inlet and blow the indoor air or the outdoor air into a vehicle interior; and a control part configured to control a rotational speed of the blower according to an air flow rate level of the air conditioning system, wherein the control part is configured to control the blower to rotate at different rotational speeds according to the outdoor air mode or indoor air mode at the same air flow rate level of the air conditioning system, and

wherein the control part is configured to execute control to make the rotational speed of the blower higher in the outdoor air mode by 0.5 rotation speed level than in other air intake modes than the outdoor air mode.

10. A vehicular air conditioning system, comprising:

an intake part including an intake door configured to open an outdoor air inlet to introduce an outdoor air in an outdoor air mode, open an indoor air inlet to introduce an indoor air in an indoor air mode, and control an opening degree of the outdoor air inlet or the indoor air inlet, and a blower configured to suck the indoor air or the outdoor air through the indoor air inlet or the outdoor air inlet and blow the indoor air or the outdoor air into a vehicle interior; and a control part configured to control a rotational speed of the blower according to an air flow rate level of the air conditioning system, wherein the rotational speed level of the blower is automatically adjusted according to the temperature conditions inside and outside the vehicle and the user-set temperature or the rotation speed level of the blower is adjusted according to the rotational speed level selected by the user when a user manually selects the rotational speed level from off to seventh level, and wherein the control part is configured to control the blower to rotate at different rotational speeds according to a position of the intake door at the same air flow rate level, wherein the control part is configured to execute control to increase the rotational speed of the blower in preparation for a case where the intake door at least partially opens the indoor air inlet when the intake door is positioned so as to open only the outdoor air inlet, and the control part is configured to execute control so that a PWM duty ratio of the blower when opening only the outdoor air inlet is higher by 50% or more than a PWM duty ratio of the blower when at least partially opening the indoor air inlet.

* * * * *